United States Patent
Pearen et al.

[11] Patent Number: 5,957,475
[45] Date of Patent: Sep. 28, 1999

[54] OFFSET HITCH FOR USE IN TOWING AN IMPLEMENT

[76] Inventors: Donald C. Pearen; Lloyd S. Pearen, both of P.O. Box 66 Indian Head, Saskatchewan, Canada, S0G 2K0

[21] Appl. No.: 09/100,862

[22] Filed: Jun. 22, 1998

[51] Int. Cl.⁶ .................................................. B60D 1/00
[52] U.S. Cl. ..................... 280/409; 280/421; 280/476.1; 56/15.9; 56/DIG. 14
[58] Field of Search ................... 280/409, 411.1, 280/412, 413, 476.1, 420, 421, 415.1; 56/13.5, 14.9, 15.9, DIG. 14

[56] References Cited

U.S. PATENT DOCUMENTS

| | | | |
|---|---|---|---|
| 2,702,193 | 2/1955 | Taylor et al. | 280/409 |
| 2,709,085 | 5/1955 | Stueland | 280/408 |
| 3,142,144 | 7/1964 | Ronning | 280/415.1 |
| 3,295,299 | 1/1967 | Brady et al. | 56/14.9 |
| 4,577,881 | 3/1986 | Gerber | 280/412 |
| 4,586,724 | 5/1986 | Sargent et al. | 280/412 |
| 5,082,217 | 1/1992 | Parker et al. | 280/421 |

*Primary Examiner*—Kevin Hurley
*Assistant Examiner*—William R Zimmerli
*Attorney, Agent, or Firm*—Adrian D. Battison; Murray E. Thrift

[57] ABSTRACT

A hitch apparatus for connection between a tractor and a trailing implement such as a mower includes a hitch arm at one end of the apparatus extending forwardly and pivotal so as to extend either inwardly or outwardly thus offsetting the apparatus across the rear of the tractor. The apparatus includes the drawbar hitch at the rear spaced across from the hitch arm for attachment to the mower so that the mower is offset to one side of the tractor. Two gear boxes and a drive shaft provide connection from the PTO of the tractor to the drive input of the mower. The offset hitch apparatus allows the mower to run in a ditch while the tractor remains on level ground.

18 Claims, 3 Drawing Sheets

OFFSET HITCH FOR USE IN TOWING AN IMPLEMENT

This invention relates to an offset hitch apparatus which can be attached to a tractor for towing an implement behind the tractor with the implement offset to one side of the tractor. The apparatus is particularly but not exclusively designed for use in towing a mower behind a tractor so that the mower can effect a cutting action in a ditch while the tractor remains on level ground.

BACKGROUND OF THE INVENTION

It is well known that various mowing attachments can be towed behind a tractor. In most cases the mowing attachment comprises a gang mower defined by a plurality of rotary mower elements connected together in a frame arrangement which may or may not provide pivotal action between each rotary element and the others. Normally the gang mower is towed directly behind the tractor and this provides an effective cutting action on level ground where the mower can be simply pulled centrally and directly behind the tractor.

However it has been a long standing problem for providing an effective cutting action in a ditch to one side of a roadway.

In many cases the tractor driver simply drives the tractor in the ditch with the mower towed behind to provide a cutting action directly behind the tractor.

In some cases some degree of offset can be provided by moving the drawbar hitch of the tractor to one side since most tractors have the ability to allow the hitch to be moved to respective sides of the centre position. However this amount of offset is very limited and certainly does not allow the tractor to remain on level ground while the mower is in the ditch.

Specially designed equipment has therefore been provided for this function including sickle bars which are carried to one side of the tractor and a ditch swather in which a swathing assembly is mounted at the outer end of a frame unit towed behind the tractor with the ditch swather being pivotal about a horizontal axis along the direction of movement so that it can run on level ground or can pivot downwardly into a ditch. However these special devices are limited in application and relatively expensive.

SUMMARY OF THE INVENTION

It is one object of the present invention, therefore to provide an improved apparatus which allows a conventional mower to be used for mowing a ditch while a tractor remains on level ground.

According to one aspect of the invention there is provided an off-set hitch apparatus for connection of an implement to a tractor comprising:

a frame having ground wheels for transportation across the ground, said frame and ground wheels defining an intended direction of working movement;

a hitch arm attached to a forward end of the frame at one end of the frame and having a hitch coupling at a forward end of the arm for connecting the offset hitch apparatus to the draw bar hitch of the tractor; and a power input shaft for connection to the power take-off of the tractor;

a draw bar hitch at a rear end of the frame and offset to one side of a rear end of the hitch arm relative to the direction of working movement for connecting to a hitch coupling of an implement such that the implement is towed at a position offset to said one side from said draw bar hitch of the tractor;

a power take-off drive shaft at the draw bar hitch of the frame for supplying drive power to the implement, and a drive coupling for communicating drive from the power input shaft to the power take-off shaft;

the hitch arm being arranged to pivot relative to the direction of working movement about a substantially vertical axis between a first position inclined forwardly and to the side away from the draw bar hitch of the frame and a second position inclined forwardly and to the side toward the draw bar hitch of the frame.

Preferably the frame comprises two parallel beams at right angles to the direction of movement, a first at the front connected to the hitch arm and the second behind connected to the draw bar hitch and two connecting struts interconnecting the beams.

Preferably the draw bar hitch is directly connected to the second beam.

Preferably the ground wheels include a first wheel at an end of the frame opposite to the hitch arm which first wheel is mounted at a second end of the frame and a second wheel extending rearwardly from the frame behind the hitch arm.

Preferably the second wheel is arranged inwardly of the first end of the frame.

Preferably the drive coupling includes a first gear box on the frame behind the input shaft, a second gear box on the frame in front of the power take-off shaft and a drive shaft interconnecting the first and second gear boxes extending along the frame generally at right angles to the direction of movement.

Preferably the hitch arm is pivoted manually and locked in place by a pin.

Preferably the hitch arm is pivoted by a hydraulic cylinder.

According to a second aspect of the invention there is provided a hitch apparatus for use in connecting a mower to a tractor for mowing a ditch while the tractor remains out of the ditch on level ground, the tractor having a draw bar hitch and a power take-off shaft at a rear of the tractor, the mower having a hitch coupling at a forward end and a power input shaft at the hitch coupling for receiving input power for driving the mower, the apparatus comprising:

a frame having ground wheels for transportation across the ground, said frame and ground wheels defining an intended direction of working movement;

a hitch arm attached to a forward end of the frame at one end of the frame and having a hitch coupling at a forward end of the arm for connecting the offset hitch apparatus to the draw bar hitch of the tractor;

a power input shaft for connection to the power take-off of the tractor;

a draw bar hitch at a rear end of the frame and offset to one side of a rear end of the hitch arm relative to the direction of working movement for connecting to a hitch coupling of an implement such that the implement is towed at a position offset to said one side from said draw bar hitch of the tractor;

a power take-off drive shaft at the draw bar hitch of the frame for supplying drive power to the implement, and a drive coupling for communicating drive from the power input shaft to the power take-off shaft;

the hitch arm being arranged to pivot relative to the direction of working movement about a substantially vertical axis between a first position inclined forwardly and to the side away from the draw bar hitch of the frame in which the mower is offset to one side of the tractor for mowing in the ditch and a second position inclined forwardly and to the side toward the draw bar hitch of the frame in which the mower is moved toward a position trailing behind the tractor for transport.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
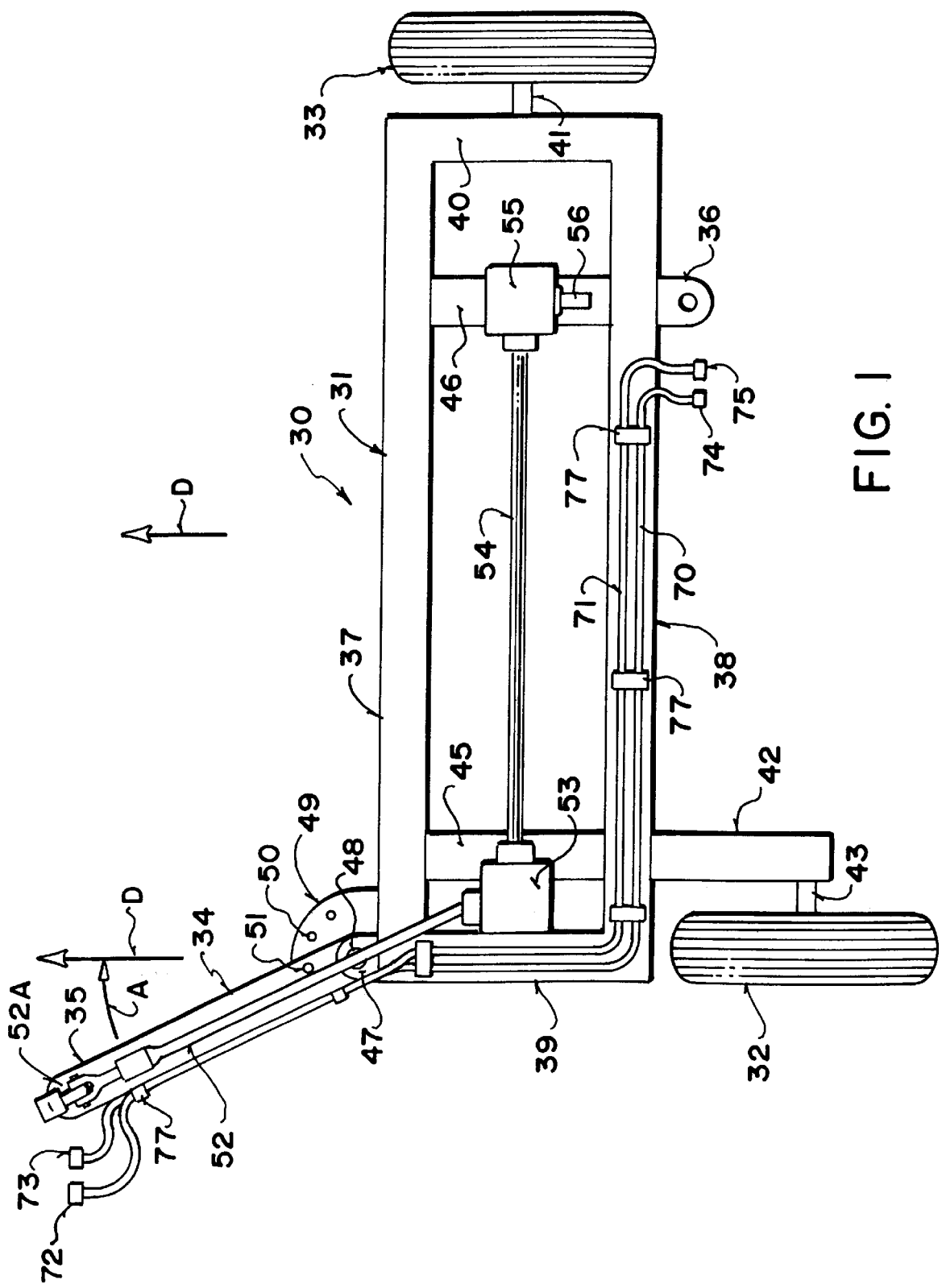
FIG. 1 is a top plan view of a hitch apparatus according to the present invention for attachment between a tractor and a mower.

A conventional tractor is indicated at 10 and includes a drawbar hitch 11 and a power take off shaft 12.

A conventional gang mower is shown at 13 and includes three rotary mower elements 14, 15 and 16 carried on a frame 17. At the front of the frame 17 is provided a hitch coupling 18 which is normally directly connected to the drawbar hitch 11 together with a power input shaft 19 which is normally connected to the power take off shaft 12 and provides drive through a series of drive shaft elements 20 to respective ones of the rotary mower elements.

In order that the mower 13 can run in a ditch while the tractor remains on level ground, there is provided an offset hitch apparatus generally indicated at 30 connected between the drawbar hitch 11 of the tractor and the hitch coupling 18 of the mower. The apparatus 30 comprises a frame 31 mounted on ground wheels 32 and 33 for rolling movement across the ground in a direction of normal working movement indicated at D. The frame further includes a hitch arm 34 with a hitch coupling 35 at the forward end for connection to the drawbar hitch 11 of the tractor. The frame further includes a draw bar hitch 36 for connection to the hitch coupling 18 of the mower.

The frame 31 includes a front beam 37 and a rear beam 38 both of which are parallel and at right angles to the direction D. The frame are interconnected by side struts 39 and 40 at right angles to the beams and at the ends of the beams. The wheel 33 is mounted on a spindle 41 welded to the outside surface of the strut 40. The wheel 32 is mounted on an arm 42 extending rearwardly from the rear surface of the rear beam 38. The wheel 32 includes a spindle 43 extending at right angles to the arm 42. The wheel 32 is mounted at or just inside the outside surface of the strut 39.

The frame thus forms a rectangular frame structure with the spindles 41 and 43 lying in a common plane with the rectangular frame structure.

The frame further includes a pair of cross members 45 and 46 parallel to the struts 39 and 40 and spaced inwardly therefrom.

The hitch arm 34 is mounted for pivotal movement on a bracket 47 on the front face of the beam 37 at the end adjacent the strut 39. The hitch arm 34 thus extends forwardly from the beam 37 in a common plane with the frame structure and can pivot about a vertical axis defined by a pivot pin 48 at the bracket 47. The hitch arm 34 can be locked in a plurality of different positions by a locking mechanism defined by a locking plate 49 having a plurality of holes 50 which cooperate with a hole 51 in the arm 34 allowing the arm to be locked in place by a pin passing through a selected one of the holes 50.

An input shaft coupling 52A is arranged for connection to the PTO shaft 12 of the tractor. The input shaft coupling 52A connects to a drive shaft 52 communicating with a first angle gear box 53. An output of the gear box 53 communicates to a drive shaft 54 extending along the frame generally at right angles to the direction D. The drive shaft 54 drives a second right angle gear box 55 with an output 56 forming a power take off shaft for connection to the drive coupling 19 of the mower. The gear boxes 53 and 55 are mounted for support on the cross members 45 and 46.

Hydraulic hoses 70 and 71 are routed across the frame in a suitable path from quick connectors 72 and 73 at the forward end of the hitch arm to quick connectors 74 and 75 at the draw bar hitch 36 to supply hydraulic fluid from the tractor to the mower. The hoses are held in place at the selected path by suitable tie downs 77.

Figure 2:
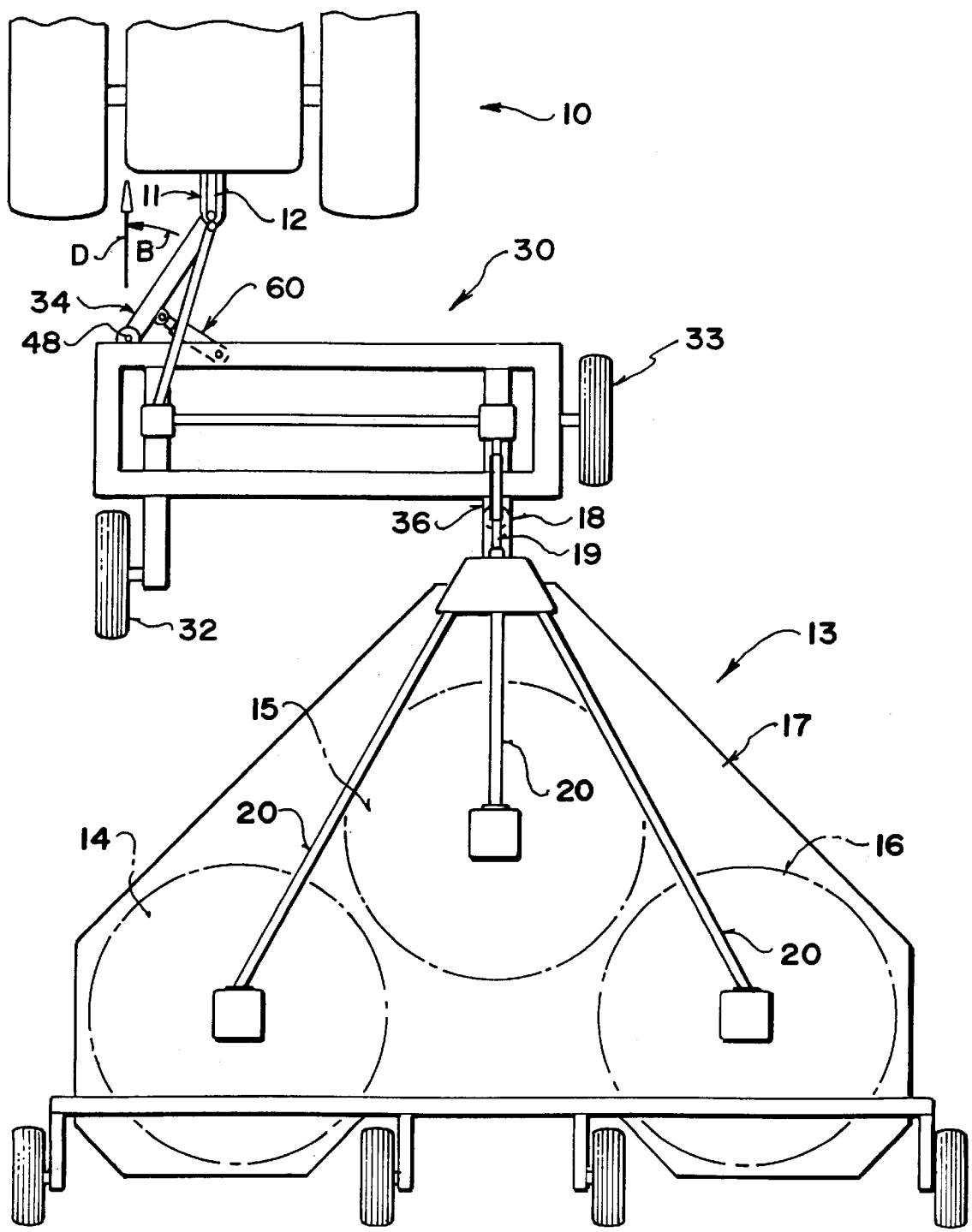
FIG. 2 is a top plan view of the apparatus of FIG. 1 showing the attachment of the apparatus to the tractor and to the mower.
Figure 3:
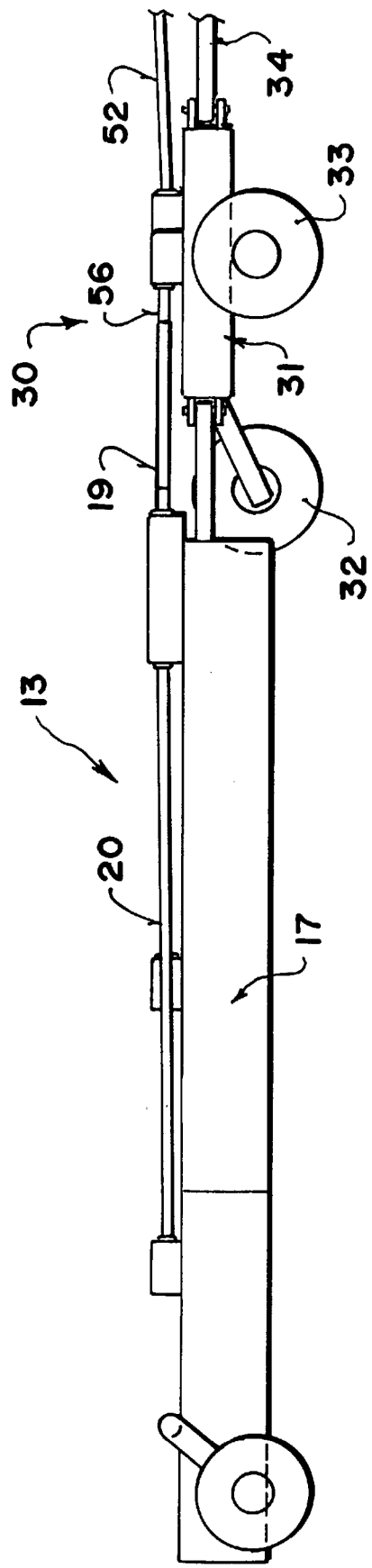
FIG. 3 is a side elevational view of the apparatus as shown in FIG. 2.

In the embodiment shown in FIG. 2, the locking arrangement 49 is replaced by a hydraulic cylinder 60 which can drive the hitch arm 34 to the required position about the pivot pin 48.

In operation, in the position shown in FIG. 1, with the hitch arm 34 pivoted to a position so that it extends at an angle A forwardly and to the outside of the strut 39 relative to the direction D, the tractor can run on level ground with its inside wheel running at the top of a ditch and also the inside wheel 32 of the hitch 30 running approximately at the top of the ditch. The outer end of the frame of the hitch 30 and the wheel 33 extend into the ditch so the frame then inclines downwardly into the ditch. The hitch outer 36 for the mower is therefore located adjacent the outer end of the frame within the ditch and allows the mower to be pulled along the ditch with the inside edge of the mower running at the top of the ditch and the outside edge of the mower running at a position spaced across the ditch.

It is also possible to reduce the amount of offset of the mower relative to the tractor by reducing the angle A.

In the position shown in FIG. 2, the hitch arm 34 is pivoted to a position extending forwardly and to the opposite side at an angle B to the direction D. This moves the frame and the apparatus 30 inwardly to trail approximately symmetrically behind the tractor and also moves the hitch 36 across the mower is still offset but offset by a significantly reduced amount. The mower is therefore trailed closer to a position directly behind the tractor for transport or for conventional mowing in the field.

The positioning of the wheel 32 rearwardly of the frame reduces the tendency of the hitch to twist about the connection to the tractor due to the torque that is applied to the hitch apparatus by the turning forces applied to the mower.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

We claim:

1. An off-set hitch apparatus for connection of an implement to a tractor having a draw bar hitch and a power take-off, the apparatus comprising:

a frame having ground wheels for transportation across the ground, said frame and ground wheels defining an intended direction of working movement and having first and second ends spaced transversely of the direction of movement;

a hitch arm having a rear end of the hitch arm attached to a forward part of the frame at said first end of the frame so as to extend forwardly therefrom and having a hitch coupling at a forward end of the hitch arm for connecting the off-set hitch apparatus to the draw bar hitch of the tractor;

a power input shaft adjacent the hitch arm for connection to the power take-off of the tractor;

a draw bar hitch at a rear part of the frame and offset from the rear end of the hitch arm toward the second end of the frame for connecting to a hitch coupling of the implement such that the implement is towed by said draw bar hitch of the frame at a position offset from said draw bar hitch of the tractor toward said second end of the frame;

a power take-off drive shaft at the draw bar hitch of the frame for supplying drive power to the implement, and a drive coupling for communicating drive from the power input shaft to the power take-off shaft, the drive coupling including a first gear box on the frame behind the power input shaft, a second gear box on the frame in front of the power take-off shaft and a drive shaft interconnecting the first and second gear boxes extending along the frame generally at right angles to the direction of movement;

the hitch arm being arranged to pivot relative to the direction of working movement about a substantially vertical axis between a first position inclined forwardly and to the side away from the draw bar hitch of the frame and a second position inclined forwardly and to the side toward the draw bar hitch of the frame.

2. The apparatus according to claim 1 wherein the frame consists essentially of two parallel beams at right angles to the direction of movement and extending from the first end to the second end, a first at the front connected to the hitch arm and the second behind connected to the draw bar hitch and a plurality of connecting struts interconnecting the beams.

3. The apparatus according to claim 1 wherein the ground wheels include a first wheel at the first end of the frame extending rearwardly from the frame behind the hitch arm and a second wheel at the second end of the frame.

4. The apparatus according to claim 3 wherein the first wheel is arranged inwardly of the first end of the frame.

5. The apparatus according to claim 1 wherein the hitch arm is pivoted manually and locked in place by a pin.

6. The apparatus according to claim 1 wherein the hitch arm is pivoted by a hydraulic cylinder.

7. A combination comprising:

a tractor having a draw bar hitch and a power take-off;

a mower having a hitch coupling; and an off-set hitch apparatus for connection of the mower to the tractor as claimed in claim 1;

wherein the hitch coupling at the forward end of the hitch arm connects the off-set hitch apparatus to the draw bar hitch of the tractor;

wherein the hitch coupling of the mower connects the mower to the draw bar hitch at the rear end of the frame of the offset hitch apparatus; and wherein the mower is movable by adjustment of the hitch arm between a first position offset to one side of the tractor for mowing in a ditch and a second position in which the mower is moved toward a position trailing behind the tractor for transport.

8. An off-set hitch apparatus for connection of an implement to a tractor having a draw bar hitch and a power take-off, the apparatus comprising:

a frame having ground wheels for transportation across the ground, said frame and ground wheels defining an intended direction of working movement and having first and second ends spaced transversely of the direction of movement;

a hitch arm having a rear end of the hitch arm attached to a forward part of the frame at said first end of the frame so as to extend forwardly therefrom and having a hitch coupling at a forward end of the hitch arm for connecting the off-set hitch apparatus to the draw bar hitch of the tractor;

a power input shaft adjacent the hitch arm for connection to the power take-off of the tractor;

a draw bar hitch at a rear part of the frame and offset from the rear end of the hitch arm to a position adjacent the second end of the frame for connecting to a hitch coupling of the implement such that the implement is towed by said draw bar hitch of the frame at a position offset from said draw bar hitch of the tractor toward said second end of the frame;

a power take-off drive shaft at the draw bar hitch of the frame for supplying drive power to the implement, and a drive coupling for communicating drive from the power input shaft to the power take-off shaft, the drive coupling including a first gear box on the frame behind the power input shaft, a second gear box on the frame in front of the power take-off shaft and a drive shaft interconnecting the first and second gear boxes extending generally along the frame from a position adjacent the first end of the frame to a position adjacent the second end of the frame.

9. The apparatus according to claim 8 wherein the hitch arm is arranged to pivot relative to the direction of working movement about a substantially vertical axis between a first position inclined forwardly and to the side away from the draw bar hitch of the frame and a second position inclined forwardly and to the side toward the draw bar hitch of the frame.

10. The apparatus according to claim 8 wherein the ground wheels include a first wheel at the first end of the frame extending rearwardly from the frame behind the hitch arm and a second at the second end of the frame.

11. The apparatus according to claim 10 wherein the first wheel is arranged inwardly of the first end of the frame.

12. A combination comprising:

a tractor having a draw bar hitch and a power take-off;

a mower having a hitch coupling; and an off-set hitch apparatus for connection of the mower to the tractor as claimed in claim 8;

wherein the hitch coupling at the forward end of the hitch arm connects the off-set hitch apparatus to the draw bar hitch of the tractor;

wherein the hitch coupling of the mower connects the mower to the draw bar hitch at the rear end of the frame of the offset hitch apparatus; and wherein the mower is movable by adjustment of the hitch arm between a first position offset to one side of the tractor for mowing in a ditch and a second position in which the mower is moved toward a position trailing behind the tractor for transport.

13. An off-set hitch apparatus for connection of an implement to a tractor having a draw bar hitch and a power take-off, the apparatus comprising:

a frame having ground wheels for transportation across the ground, said frame and ground wheels defining an intended direction of working movement and having first and second ends spaced transversely of the direction of movement, the frame consisting essentially of two parallel beams at right angles to the direction of movement and extending from the first end to the second end and a plurality of interconnecting struts;

a hitch arm having a rear end of the hitch arm attached at a forward one of the parallel beams of the frame at said first end of the frame so as to extend forwardly therefrom and having a hitch coupling at a forward end of the hitch arm for connecting the off-set hitch apparatus to the draw bar hitch of the tractor;

a power input shaft adjacent the hitch arm for connection to the power take-off of the tractor;

a draw bar hitch attached at a rear one of the parallel beams of the frame and offset from the rear end of the hitch arm to a position adjacent the second end of the frame for connecting to a hitch coupling of the implement such that the implement is towed by said draw bar hitch of the frame at a position offset from said draw bar hitch of the tractor toward said second end of the frame;

a power take-off drive shaft at the draw bar hitch of the frame for supplying drive power to the implement, and a drive coupling for communicating drive from the power input shaft to the power take-off shaft, the drive coupling including a first gear box on the frame behind the power input shaft, a second gear box on the frame in front of the power take-off shaft and a drive shaft interconnecting the first and second gear boxes extending generally along the frame from a position adjacent the first end of the frame to a position adjacent the second end of the frame.

14. The apparatus according to claim 13 wherein the hitch arm being arranged to pivot relative to the direction of working movement about a substantially vertical axis between a first position inclined forwardly and to the side away from the draw bar hitch of the frame and a second position inclined forwardly and to the side toward the draw bar hitch of the frame.

15. The apparatus according to claim 13 wherein the ground wheels include a first wheel at the first end of the frame extending rearwardly from the frame behind the hitch arm and a second at the second end of the frame.

16. The apparatus according to claim 15 wherein the first wheel is arranged inwardly of the first end of the frame.

17. The apparatus according to claim 13 wherein there is provided a pair of hydraulic hoses extending from connectors at the hitch arm for connection to the tractor to connectors at the draw bar hitch of the frame for connection to the implement, the hoses being connected to the frame to run along a predetermined path therealong.

18. A combination comprising:

a tractor having a draw bar hitch and a power take-off;

a mower having a hitch coupling; and an off-set hitch apparatus for connection of the mower to the tractor as claimed in claim 13;

wherein the hitch coupling at the forward end of the hitch arm connects the off-set hitch apparatus to the draw bar hitch of the tractor;

wherein the hitch coupling of the mower connects the mower to the draw bar hitch at the rear end of the frame of the offset hitch apparatus; and wherein the mower is movable by adjustment of the hitch arm between a first position offset to one side of the tractor for mowing in a ditch and a second position in which the mower is moved toward a position trailing behind the tractor for transport.

* * * * *